Aug. 11, 1953 G. A. LACOUT 2,648,365
DOMESTIC CHOPPING DEVICE FOR VEGETABLE MATTER
Filed Feb. 10, 1949 2 Sheets-Sheet 1
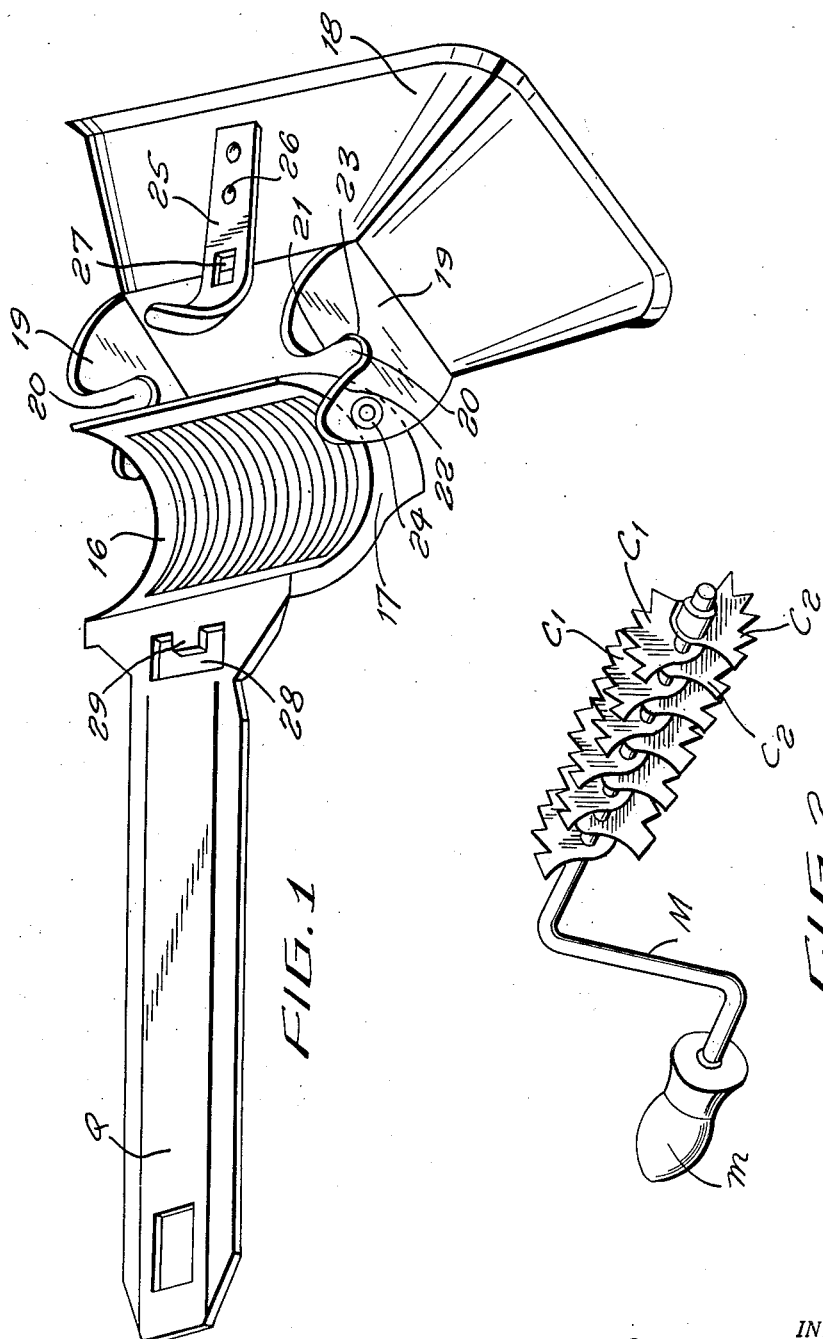
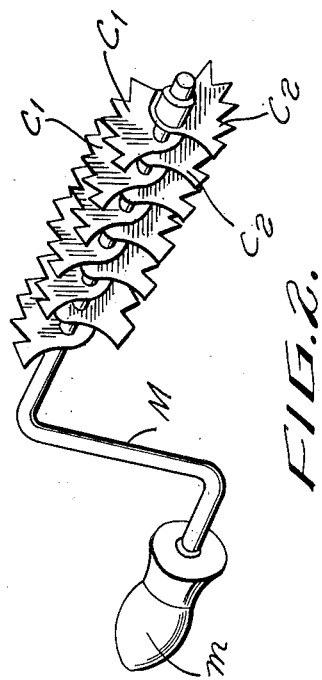
INVENTOR.
GEORGES AUGUSTE LACOUT
BY Aug. 11, 1953   G. A. LACOUT   2,648,365
DOMESTIC CHOPPING DEVICE FOR VEGETABLE MATTER
Filed Feb. 10, 1949   2 Sheets-Sheet 2
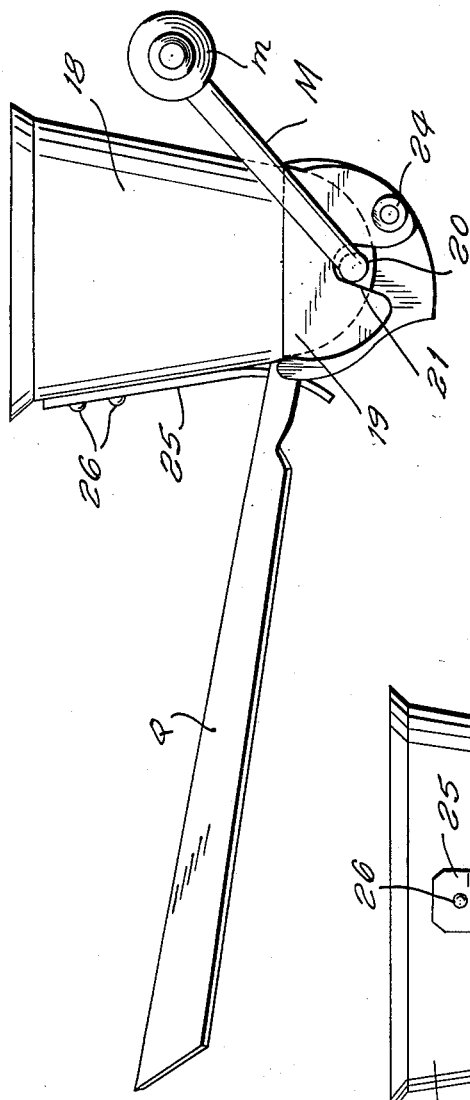
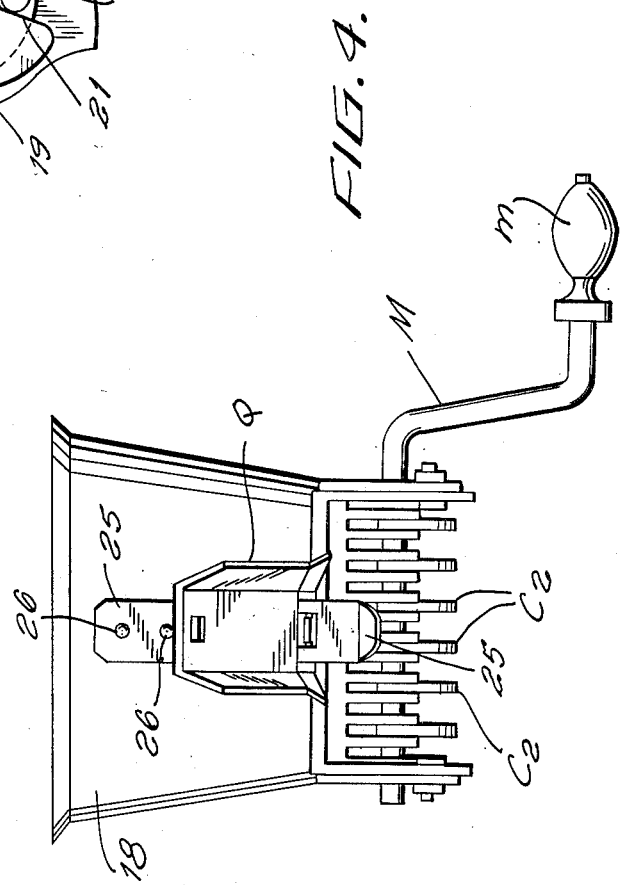
INVENTOR.
GEORGES AUGUSTE LACOUT
BY Patented Aug. 11, 1953

2,648,365

UNITED STATES PATENT OFFICE 2,648,365

DOMESTIC CHOPPING DEVICE FOR VEGETABLE MATTER

Georges Auguste Lacout, Paris, France, assignor to Societe Civile d'Etudes pour la Fabrication de Produits Industriels Manufactures (S. E. P. I. M.), Paris, France Application February 10, 1949, Serial No. 75,687
In France February 27, 1948

4 Claims. (Cl. 146—123)

My copending application for Patent Ser. 699,223, filed on September 25, 1946, now Pat. No. 2,507,571, discloses a domestic chopping device with a plurality of rotary cutters for vegetable matter made up, on the one hand, of a container in the shape of a hopper adapted to receive the vegetables to be chopped up, on the other hand, of a receptacle provided with a slotted bottom, constituting a sort of comb and, lastly, of a plurality of discs provided with teeth and carried by a right angled crank handle spindle, housed in an eccentric manner inside the receptacle so as to ensure a minimum projection of the teeth outside the comb.

In a practical embodiment disclosed in said copending application for patent, the receptacle, that is rigid with a handle enabling the chopper to be held above the foodstuffs to be flavoured, assumes the shape of a channel of semicircular cross section, closed at both ends, that are provided with elongated slots the bottom of which located underneath the axis of the channelled piece forms the bearings carrying the spindle of the crank-handle. The latter is held in contact with its bearings by special means that may be composed of stops fixed rigidly with the hopper-like container, that is set slidingly on the upper portion of the receptacle.

It has been found, on the one hand, that the end walls of the channel-shaped piece with their accompanying parts made cleaning difficult and left behind in the channel remains of cut up vegetables that it was hard to get through the slots of the comb and on the other hand, that the insertion of the edges of the receptacle into the slideways of the container formed a hard task.

The object of the present invention is a method of construction that does away with these inconveniences and that is characterised by the fact that the comb, through which the cutting edges are adapted to pass, is formed by a channel-shaped piece open at both ends, while the hopper-like container is set to swing over the comb and carries two side extensions adapted to shut off the ends of the latter and provided with openings of which the bottom acts as a bearing for the spindle of the crank handle, while a clamping device interlocks the hopper and the comb in the working position.

This arrangement makes it easier to clean the comb and enables the last remains of cut vegetables to be removed very simply merely by passing a finger over it. Moreover, the spindle of the crank-handle, that is supported, on the one hand, on the full portions of the comb and, on the other hand, on the head of the said openings is held in perfect security.

A method of carrying the invention into effect is illustrated as an example in the accompanying drawings, in which:

Figure 1 is a perspective view of a chopping device according to the invention with the container shown in the swung position.

Figure 2 shows a perspective view of the spindle of the crank-handle carrying the toothed discs.

Figure 3 is an elevational view of the chopping device in its working position, and Figure 4 is an end view from the side of the handle.

The chopping device illustrated in the accompanying drawings is provided with a comb manufactured in one with the handle Q and formed by a trough or channel piece open at both ends and of which the edges are bent over at right angles at 17 with the object, on the one hand, of making the whole assembly stronger and, on the other hand of forming lugs of greater height than the amount of projection of the discs beyond the trough with the object of avoiding any damage to the teeth when the chopper is placed, for instance, on a table.

The container 18, assuming the shape of a hopper, is provided with side extensions 19 that are intended to shut off the end of the channelled piece in the working position (Fig. 3) and is adapted to swing over the edges 17 of the comb by means of spindles 24 formed in the example illustrated by rivets. Any other method of hinging might be taken and especially a method of hinging that would enable the container to be completely removed.

In each extension 19 of the container is arranged a medial opening 20 of which the bottom 23 bent over at right angles outwardly acts as a bearing for the spindle M carrying the discs $C_1$, $C_2$ (Figure 2) and that rests on the solid portions of the comb. The edges 21 and 22 of these openings 20 assume the shape of cams or of converging curved sloping surfaces that ensure the automatic centering of the spindle M carrying the discs.

The surface of the container nearest to the handle Q carries a spring blade 25 riveted at 26 and provided at its lower portion with an opening 27 intended to engage with a stud 29 formed inside an opening 28 provided in the handle. The mere folding over of the container 18 into its working position effects its clamping, while it is unlocked by moving aside the end of the spring blade 25 so as to release it from the stud 29 and by swinging back the container in the reverse direction.

The spindle M of the crank-handle carries the discs $C_1$, $C_2$, that are suitably braced and arranged so that the crank-handle is altogether located in the axial plane of symmetry corresponding to the toothed portions of the discs. This arrangement makes it easier to position the toothed discs in the openings of the comb.

What I claim is:

1. In a chopping device for vegetable matter and the like of the type provided with a plurality of rotary cutters, the combination of a substantially semi-cylindrical holding base member having an open top, open ends and a bottom wall provided with chopping slots into which the rotary cutters fit; a hopper having an open top and an open bottom and adapted to be moved from inoperative position with the open bottom thereof spaced from the open top of said holding base member into operative position in which said hopper is located above said base member with the open bottom thereof communicating with the open top of said base member, said hopper having downwardly extending opposite end wall portions arranged at opposite ends of said hopper extending downwardly from the open bottom thereof so as to close in operative position of said hopper, said opposite open ends of said holding base member; oppositely disposed open elongated bearing recesses formed in said downwardly extending end wall portions of said hopper shaped so as to be open when said hopper is in inoperative position and to be closed at their open ends by said base member when said hopper is in operative position thus limiting said bearing recesses to close bearing openings; a shaft for supporting and operating the rotary cutters, said shaft being adapted to be inserted and received in said open bearing recesses when said hopper is in inoperative position, and to be supported within the closed bearing openings to which said bearing recesses are limited when said hopper is in operative position; means associated with said shaft for rotating the same; means movably securing said hopper to said base member movably between inoperative and operative positions; and releasable means for locking said hopper in operative position whenever desired.

2. In a chopping device for vegetable matter and the like of the type provided with a plurality of rotary cutters, the combination of a substantially semi-cylindrical holding base member having an open top, open ends and a bottom wall provided with chopping slots into which the rotary cutters fit; a hopper having an open top and an open bottom and adapted to be moved from inoperative position with the open bottom thereof spaced from the open top of said holding base member into operative position in which said hopper is located above said base member with the open bottom thereof communicating with the open top of said base member, said hopper having downwardly extending opposite end wall portions arranged at opposite ends of said hopper extending downwardly from the open bottom thereof so as to close in operative position of said hopper, said opposite open ends of said holding base member; oppositely disposed open elongated bearing recesses formed in said downwardly extending end wall portions of said hopper shaped so as to be open when said hopper is in inoperative position and to be closed at their open ends by said base member when said hopper is in operative position thus limiting said bearing recesses to close bearing openings; a shaft for supporting and operating the rotary cutters, said shaft being adapted to be inserted and received in said open bearing recesses when said hopper is in inoperative position, and to be supported within the closed bearing openings to which said bearing recesses are limited when said hopper is in operative position; means associated with said shaft for rotating the same; means pivotally securing said opposite end wall portions of said hopper to said base member pivotally so that said hopper is movable in longitudinal direction of said elongated bearing recesses.

3. In a chopping device for vegetable matter and the like of the type provided with a plurality of rotary cutters, the combination of a substantially semi-cylindrical holding base member having an open top, open ends and a bottom wall provided with chopping slots into which the rotary cutters fit; a hopper having an open top and an open bottom and adapted to be moved from inoperative position with the open bottom thereof spaced from the open top of said holding base member into operative position in which said hopper is located above said base member with the open bottom thereof communicating with the open top of said base member, said hopper having downwardly extending opposite end wall portions arranged at opposite ends of said hopper extending downwardly from the open bottom thereof so as to close in operative position of said hopper, said opposite open ends of said holding base member; oppositely disposed open elongated bearing recesses formed in said downwardly extending end wall portions of said hopper shaped so as to be open when said hopper is in inoperative position and to be closed at their open ends by said base member when said hopper is in operative position thus limiting said bearing recesses to close bearing openings; a shaft for supporting and operating the rotary cutters, said shaft being adapted to be inserted and received in said open bearing recesses when said hopper is in inoperative position, and to be supported within the closed bearing openings to which said bearing recesses are limited when said hopper is in operative position; means associated with said shaft for rotating the same; pivotal connections between said base member and said opposite end wall portions, respectively, of said hopper defining a pivotal axis being parallel to the axis of said semi-cylindrical base member so that said hopper is turnable about said pivotal axis between inoperative and operative positions; and releasable means for locking said hopper in operative position whenever desired.

4. In a chopping device for vegetable matter and the like of the type provided with a plurality of rotary cutters, the combination of a substantially semi-cylindrical holding base member having an open top, open ends and a bottom wall provided with chopping slots into which the rotary cutters fit; a hopper having an open top and an open bottom and adapted to be moved from inoperative position with the open bottom thereof spaced from the open top of said holding base member into operative position in which said hopper is located above said base member with the open bottom thereof communicating with the open top of said base member, said hopper having downwardly extending opposite end wall portions arranged at opposite ends of said hopper extending downwardly from the open bottom thereof so as to close in operative position of said hopper, said opposite open ends of said holding base member; oppositely disposed open elongated bearing recesses formed in said downwardly extending end wall portions of said hopper shaped so as to be open when said hopper is in inoperative position and to be closed at their open ends by said base member when said hopper is in operative position thus limiting said bearing recesses to close bearing openings; a shaft for supporting and operating the rotary cutters, said shaft being adapted to be inserted and received in said open bearing recesses when said hopper is in inoperative position, and to be supported within the closed bearing openings to which said bearing recesses are limited when said hopper is in operative position; means associated with said shaft for rotating the same; pivotal connections between said base member and said opposite end wall portions, respectively, of said hopper defining a pivotal axis being parallel to the axis of said semi-cylindrical base member so that said hopper is turnable about said pivotal axis between inoperative and operative positions; and releasable means for locking said hopper in operative position whenever desired, said releasable means being arranged opposite to said pivotal axis defined by said pivotal connections.

GEORGES AUGUSTE LACOUT.

References Cited in the file of this patent

UNITED STATES PATENTS

| Number | Name | Date |
|---|---|---|
| 112,872 | Wehrle | Mar. 21, 1871 |
| 550,645 | Repp | Dec. 3, 1895 |
| 2,001,075 | Sandstrand | May 14, 1935 |
| 2,280,211 | Bernhardt | Apr. 21, 1942 |
| 2,507,571 | Lacout | May 16, 1950 |

FOREIGN PATENTS

| Number | Country | Date |
|---|---|---|
| 729,229 | France | July 20, 1932 |
| 546,680 | Great Britain | July 24, 1942 |
| 920,817 | France | Jan. 8, 1947 |